United States Patent
Schmidt et al.

(10) Patent No.: US 8,667,885 B2
(45) Date of Patent: Mar. 11, 2014

(54) ACTUATING DEVICE FOR A SHIFT ELEMENT OF A TRANSMISSION DEVICE WHICH CAN BE APPLIED WITH AN ACTUATING PRESSURE

(75) Inventors: Thilo Schmidt, Meckenbeuren (DE); Georg Gierer, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 767 days.

(21) Appl. No.: 12/950,062

(22) Filed: Nov. 19, 2010

(65) Prior Publication Data
US 2011/0138957 A1   Jun. 16, 2011

(30) Foreign Application Priority Data
Dec. 11, 2009   (DE) .......................... 10 2009 054 541

(51) Int. Cl.
*F16H 61/28* (2006.01)

(52) U.S. Cl.
USPC ............................................. 91/433; 60/461

(58) Field of Classification Search
USPC ..................... 91/433; 60/461; 192/3.57, 85.63
See application file for complete search history.

(56) References Cited

U.S. PATENT DOCUMENTS

| 5,924,539 A | 7/1999 | Braun et al. |
| 6,905,433 B2 * | 6/2005 | Schmidt et al. ................ 475/121 |
| 8,147,380 B2 * | 4/2012 | Fritzer ........................... 477/158 |

FOREIGN PATENT DOCUMENTS

| DE | 197 21 036 A1 | 11/1997 |
| DE | 102 22 447 A1 | 12/2003 |
| DE | 102 39 915 A1 | 3/2004 |
| DE | 10 2007 020 346 A1 | 11/2008 |

\* cited by examiner

*Primary Examiner* — Edward Look
*Assistant Examiner* — Logan Kraft
(74) *Attorney, Agent, or Firm* — Davis & Bujold, PLLC; Michael J. Bujold (57) ABSTRACT

An actuating device for a shift element of a transmission which is acted upon by a hydraulic actuating pressure (p_B1) and comprises a valve device. To vary the actuating pressure (p_B1), the valve device is acted upon by a control pressure (p_EDS) in an area of active surfaces (A18, A19) of at least a first and a second valve slides. An active surface (A38) of the first valve slide (A8) is acted upon by a hydraulic pressure (p_B2) which is equivalent to the actuating pressure (p_B1), acts in opposition to the control pressure (p_EDS) and can be adjusted as a function of the control pressure (p_EDS) applied, such that a smaller variation of the actuating pressure (p_B1) results from a change of the control pressure (p_EDS) within a first pressure range of the control pressure (p_EDS) than within a second pressure range of the control pressure (p_EDS).

15 Claims, 9 Drawing Sheets

|     | A | B | C | D | E |
|-----|---|---|---|---|---|
| "P" | ● | ● |   |   |   |
| "R" | ● | ● |   | ● |   |
| "N" | ● | ● |   |   |   |
| "1" | ● | ● | ● |   |   |
| "2" | ● | ● |   |   | ● |
| "3" |   | ● | ● |   | ● |
| "4" |   | ● |   | ● | ● |
| "5" |   | ● | ● | ● |   |
| "6" |   |   | ● | ● | ● |
| "7" | ● |   | ● | ● |   |
| "8" | ● |   |   | ● | ● |

ACTUATING DEVICE FOR A SHIFT ELEMENT OF A TRANSMISSION DEVICE WHICH CAN BE APPLIED WITH AN ACTUATING PRESSURE

This application claims priority from German patent application serial no. 10 2009 054 541.7 filed Dec. 11, 2009.

FIELD OF THE INVENTION

The invention concerns an actuating device for a shift element of a transmission, which can be acted upon by an actuating pressure.

BACKGROUND OF THE INVENTION

Automatic transmissions known from practice are increasingly made with gearset systems by virtue of which as many gear ratios as possible can be produced with as small as possible a number of shift elements. For example, in idealized transmission systems ten gear combinations or gear ratios can be produced using five shift elements, when in each case two or three of the shift elements are connected into the force flow of a transmission.

If in each case three of the five shift elements have to be shifted into the force flow to produce a gear ratio, each of the shift elements is involved in the production of six different gears or gear ratios. However, because of the various gear ratio combinations different support factors exist in the area of a shift element. Here, in each case a support factor corresponds to a quotient of the torque actually applied on the shift element involved in producing a gear ratio and a drive torque of a drive machine of a motor vehicle drivetrain.

Depending on the transmission configuration in each case, it is possible for the support factors that correspond to the respective gear ratios to be produced in the area of the shift elements, to differ in some cases by up to a factor of 10.

A resolution of the actuation of a shift element, which is essential for the shift quality of a shift sequence in a transmission mechanism and is known as the sensitivity of the shift element, can in each case be ideally designed only for a defined shift process. To achieve a desired high shift quality for various shift operations in each of which one and the same shift element is involved, with known actuating devices an operating-condition-dependent variation of the resolution between a current specification in the area of an electrohydraulic transmission control unit, up to a transmission capacity that can be made available in the area of a shift element, can only be achieved with considerable latitude.

Basically, the resolution chain between the electric current specification up to the clutch torque involves a nominal/actual current relationship, an actual current/pilot pressure relationship, a pilot pressure/clutch valve pressure relationship, a clutch valve pressure/clutch pressure relationship, a clutch pressure/piston force relationship, a piston force/piston travel relationship and a piston travel/clutch torque relationship. In this, each individual transfer link is characterized by a particular control sensitivity. For example, to vary the sensitivity it is possible to vary the pressure range of a hydraulic actuating pressure of a shift element, for example by means of holding valves, various valve reinforcements and the like, or to change the piston area of a clutch piston of a shift element.

From DE 102 39 915 B4 a device for controlling a hydraulically actuated shift element of a motor vehicle transmission is known, in which, in the area of the shift element an effective piston area of a clutch piston is reduced by acting upon the clutch piston with hydraulic pressure in the area of an active surface in the engaging direction of the shift element and also in the area of a counter-surface in the disengaging direction. The counter-surface of the clutch piston is smaller than its active surface, in the area of which the clutch piston can be acted upon with hydraulic pressure in the engaging direction of the shift element.

Undesirably, however, the actuation of a shift element is characterized by substantial control and regulation effort since two pressures in two different piston chambers have to be regulated in tune with one another. Furthermore, the area ratio between the active surface and the counter-surface in the area of the piston element of the shift element is fixed.

SUMMARY OF THE INVENTION

Accordingly, the purpose of the present invention is to provide an actuating device by means of which a resolution of the actuation of a shift element involved in the production of various gear ratios of a transmission mechanism with support factors that differ greatly from one another, can be varied in an operating-condition-dependent manner, so as to obtain an at least approximately constantly good shift quality in the various shift sequences.

In the actuating device according to the invention for a shift element of a transmission mechanism that can be acted upon by a hydraulic actuating pressure with a valve device, to vary the actuating pressure the valve device can be acted upon by a control pressure in the area of the active surfaces of at least a first valve slide and a second valve slide.

According to the invention, an active surface of the first valve slide can be acted upon by a hydraulic pressure equivalent to the actuating pressure, which opposes the control pressure and can be adjusted by means of the second valve slide as a function of the control pressure applied, such that from a change of the control pressure within a first control pressure range the change of the actuating pressure that results is smaller than within a second control pressure range that follows on from the first range.

Thus, in a simply designed manner the actuating device according to the invention provides a hydraulic system for actuating a shift element with a clutch resolution adapted to the shift situation in each case. A switch between a first resolution and at least one second resolution takes place when a predefined pressure threshold of the control pressure is exceeded, without producing any discontinuity in the pressure variation of the actuating pressure, so that a consistently high shift quality can be ensured.

In the present case the term "resolution" is understood to mean the relationship between the pressure change of the actuating pressure of the shift element and a current variation in the area of a pressure control valve of a pilot control system by means of which the control pressure is adjusted by an electric transmission control unit.

If the first valve slide, in the area of a further active surface, can be acted upon by a further hydraulic pressure equivalent to the actuating pressure, which can be adjusted by means of a third valve slide that can be acted upon in the area of an active surface by the control pressure, a valve ratio in the area of the first valve slide can be varied in a simple manner.

In an advantageous embodiment of the actuating device, an area ratio of the first valve slide between the active surface on which the control pressure can be applied and the active surfaces acted upon, as the case may be, by the hydraulic pressure or the further hydraulic pressure, is equal to unity. The valve ratio in the area of the first valve slide can be varied with little actuation effort by switching on or switching off the hydraulic pressure equivalent to the actuating pressure or the further hydraulic pressure equivalent to the actuating pressure.

Respective embodiments of the actuating device according to the invention characterized by little control and regulation effort are, in the area of the second valve slide and/or in the area of the third valve slide, in each case made with a spring arrangement which opposes the control pressure and acts on the respective valve slides, such that the spring force of the spring associated with the third valve slide can be chosen so that the further hydraulic pressure acting on the active surface of the first valve slide, which is adjustable in the area of the third valve slide, is at least approximately zero above a threshold value of the control pressure. With little design effort this ensures that above the control pressure threshold value the first valve slide is switched over and a system pressure preferably applied on the first valve slide, to which the actuating pressure that can be adjusted by means of the first valve slide is equivalent, can be passed on entirely in the direction of the shift element and the shift element can be changed to its fully engaged operating condition.

In a further advantageous embodiment of the actuating device according to the invention a fourth valve slide is provided, to which, in the area of at least one active surface, the actuating pressure can be applied and is adjustable by virtue of an additional hydraulic pressure equivalent to the actuating pressure, with which the first valve slide can be acted upon in the area of an active surface in a direction opposed to the control pressure. In a simple manner this provides the possibility of varying the resolution of the clutch actuation in a further pressure range of the control pressure and, in a defined operating range, optimizing the actuation of the shift element for the shift situation that corresponds thereto.

In a simply designed further development of the actuating device according to the invention, a spring force of a spring arrangement that opposes the control pressure acts upon the fourth valve slide, so that the actuating device can then also be operated with little control and regulation effort.

A further embodiment of the actuating device according to the invention, also characterized by little actuation effort, comprises a spring arrangement in the area of the shift element, which opposes the actuating pressure and acts in the disengaging direction of the shift element.

Alternatively to or in combination with this, in further embodiments of the actuating device according to the invention a dual-action piston element is provided in the area of the shift element and the actuating pressure can be applied on the piston element in a first piston space, while in the area of a second piston space the piston element can be acted upon by a hydraulic actuating pressure which opposes the actuating pressure and is adjustable by means of a further valve slide. In this way the shift element is operated in the disengaging direction by a hydraulic actuating pressure that can be adjusted in the area of the actuating device.

If a system pressure or a hydraulic pressure equivalent thereto can be applied on the further valve slide, which can be varied by means of the further valve slide and can be passed on toward the second piston space, then the force component acting in the area of the shift element in the disengaging direction can be adjusted independently of the control pressure.

Alternatively, in a further advantageous embodiment of the actuating device, to vary the system pressure or the hydraulic pressure equivalent thereto the control pressure can be applied on an active surface of the further valve slide.

In a further advantageous embodiment of the actuating device according to the invention, to vary the system pressure or the hydraulic pressure equivalent thereto, a hydraulic pressure that can be adjusted in the area of the third valve slide and which is equivalent to the actuating pressure can be applied on an active surface of the further valve slide.

A hydraulic pressure that can be adjusted in the area of the further valve slide and is equivalent to the system pressure can be applied in the area of a further active surface of the further valve slide, the hydraulic pressure acting in opposition to a spring arrangement which acts upon the further valve slide.

Other advantages and advantageous design features of the actuating device according to the invention emerge from the claims and the example embodiments whose principle is described below with reference to the drawings; in the description of the various example embodiments, for the sake of clarity the same indexes are used for structurally and functionally equivalent components.

Both the features indicated in the subordinate claims and also those indicated in the following description of example embodiments of the actuating device according to the invention are in each case suitable, whether considered in isolation or in any combination with one another, for developing further the object according to the invention. In relation to such further development of the object of the invention, the respective combinations of features do not represent any limitation, but rather, are essentially only described for exemplary purposes.

DETAILED DESCRIPTION OF THE PREFERRED EMBODIMENTS

Figure 1:
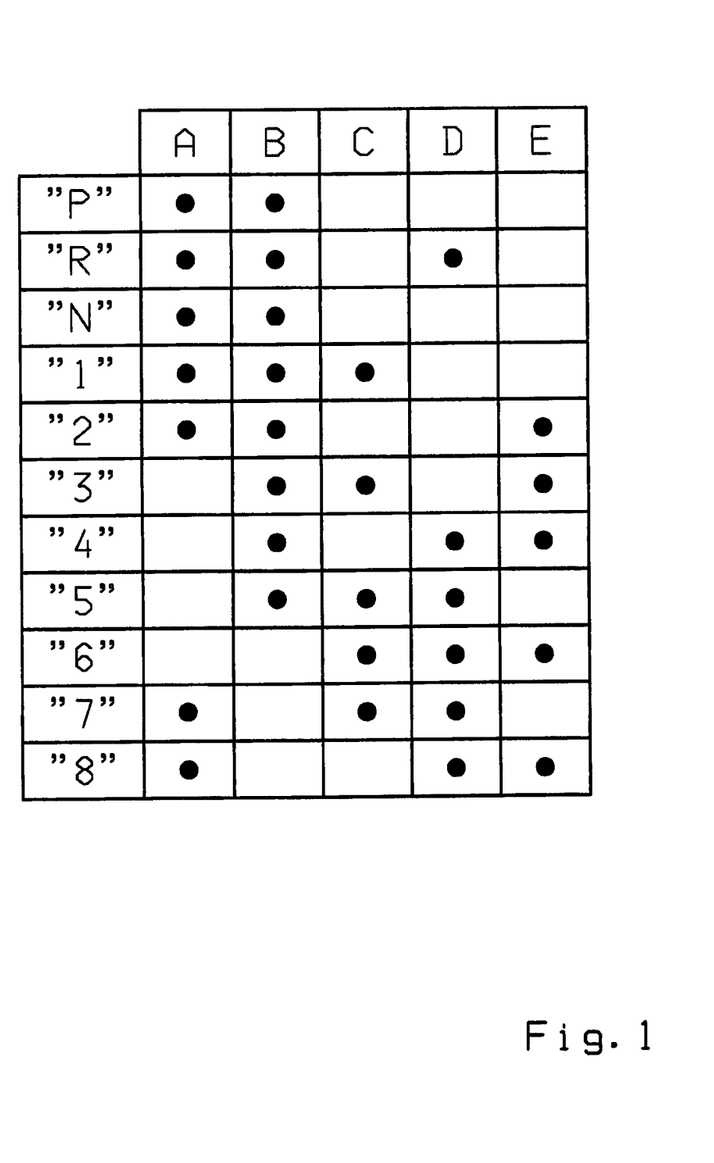
FIG. 1: Logic scheme of a transmission mechanism with five shift elements.

FIG. 1 shows a logic scheme for a transmission mechanism (not shown in the drawing) with five shift elements A to E. As a function of the actuation of the shift elements A to E, in addition to eight gear ratios "1" to "8" for driving forward, a so-termed neutral operating condition "N", during which a force flow in the transmission is interrupted, a gear ratio "R" for reversing, and a so-termed parking operating condition "P", during which a transmission output shaft connected to a drive output of a vehicle is held rotationally fixed in a known manner, can also be produced.

Both to produce the eight gear ratios "1" to "8" for driving forward and to produce the gear ratio "R" for reversing, in each case three of the shift elements A to E have to be kept in the engaged operating condition while the other two shift elements are in each case in the disengaged operating condition. To produce the neutral operating condition "N" and the parking condition "P", only the shift elements A and B are engaged while the other shift elements C to E are disengaged. The shift elements A to E are actuated by an electro-hydraulic transmission control unit in order to be able to shift and keep then in a engaged or disengaged operating condition, depending on the operating situation at the time.

Figure 2:
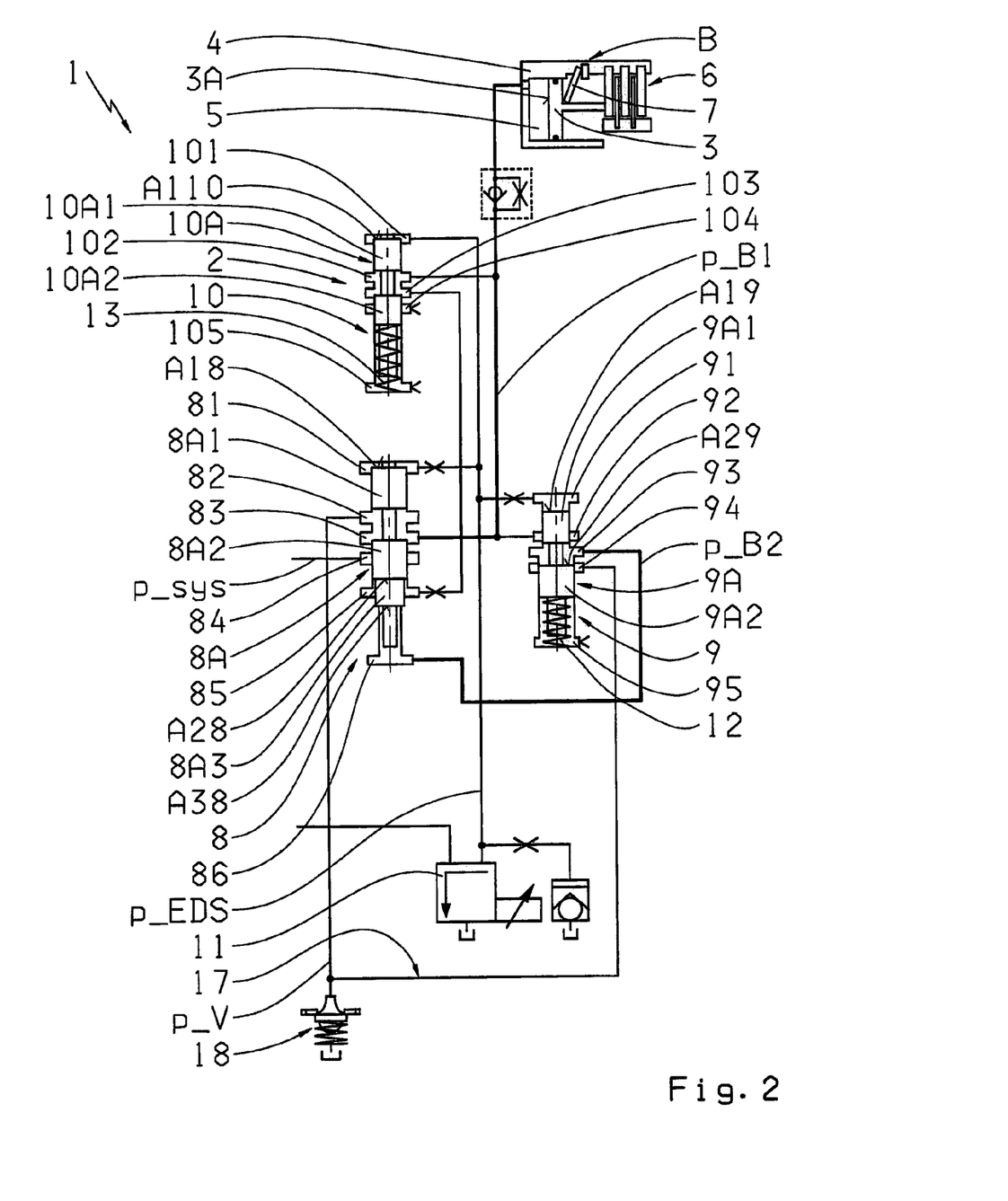
FIG. 2: Shifting scheme of an area of a first embodiment of an actuating device for a shift element that can be acted upon by a hydraulic actuating pressure.

The electro-hydraulic transmission control unit comprises an actuating device 1 made with a valve device 2, part of a first embodiment of the actuating device 1 being shown in FIG. 2 in the form of a shifting scheme or hydraulic circuit diagram. By means of the part of the actuating device 1 shown in FIG. 2, the shift element B, in the present case in the form of a disk clutch, can be actuated or acted upon by a hydraulic actuating pressure p_B1 in the manner described in more detail below.

The shift element B comprises a piston element 3 which can move in a cylinder 4 and which can be acted upon by hydraulic fluid in the area of a first piston surface 3A. With the first piston surface 3A, the piston element 3 and the cylinder 4 delimit a first piston space 5. During operation of the transmission mechanism the actuating pressure p_B1 acts upon the piston element 3 in the engaging direction of the shift element B, such that to compress a disk packet 6 of the shift element B a spring force of a spring arrangement 7 that acts on the piston element 3 in the disengaging direction, and is in this case made as a cup spring, has to be overcome.

In this case the valve device 2 comprises a first clutch valve 8 and a second clutch valve 9. In addition, a holding valve 10 is associated with the first clutch valve 8. The two clutch valves 8 and 9 and the holding valve 10 comprise in each case a respective valve slide 8A, 9A and 10A which can be moved longitudinally, which can be acted upon in the area of the active surfaces A18, A19 and A110 by a control pressure p_EDS which can be adjusted in the area of an electronic pressure regulator 11, in order to be able to vary the actuating pressure p_B1 in an operating-condition-dependent manner. Depending on the control pressure p_EDS applied at the time, the valve slides 8A, 9A and 10A are arranged and able to move in a valve housing in such manner that a through-flow of a system pressure p_sys applied on the first clutch valve 8 is regulated in the clutch space 5 in an operating-condition-dependent manner.

The electronic pressure regulator 11 shown in the drawing can be of conventional structure. Although in the preferred embodiments shown, only one pressure regulator is provided for delivering the control pressure p_EDS to the individual valves, it is alternatively also possible to use more than one pressure regulator for that purpose.

The valve slide 8A of the first clutch valve 8 has a number of valve slide sections 8A1 to 8A3 which, as a function of the control pressure p_EDS applied, leave open or seal control edges 81 to 86 of the valve housing of the first clutch valve 8. In this case the first clutch valve 8 has a valve ratio of 1:1, since the first active surface A18 of the valve slide 8A is equal to the sum of the other active or reaction-coupling surfaces A28 and A38.

The valve slide 9A of the second clutch valve 9 is made with two valve slide sections 9A1 and 9A2, by means of which, as a function of the applied control pressure p_EDS, control edges 91 to 95 of the valve housing of the second clutch valve 9 can be left open or sealed. A spring arrangement 12 acts on the valve slide 9A in opposition to the control pressure p_EDS.

The holding valve 10 or its valve slide 10A is made with two valve slide sections 10A1 and 10A2, in order to leave open or seal control edges 101 to 105 of the valve housing of the holding valve 10 as a function of the control pressure p_EDS applied on an active surface A110 of the valve slide A10 at the time, and again, a spring arrangement 13 acts on the valve slide 10A in opposition to the control pressure p_EDS.

Figure 3:
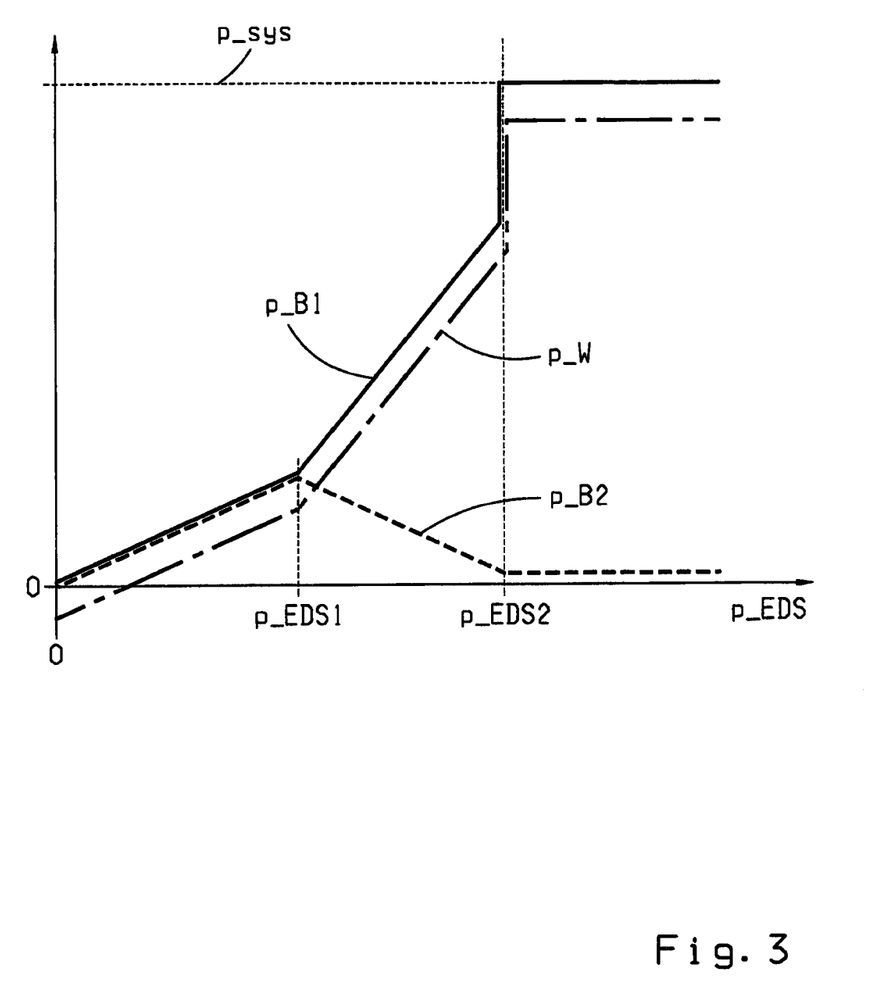
FIG. 3: A number of pressure variations that take place during the actuation of the shift element by the actuating device according to FIG. 2.

In FIG. 3, besides the variation of the actuating pressure p_B1, a variation of a hydraulic pressure p_B2 that can be adjusted as a function of the control pressure p_EDS and which is equivalent to the actuating pressure p_B1, and the variation of a so-termed functional pressure p_W, are shown. Here, the functional pressure p_W corresponds to the total force component acting on the piston element 3 at the time, which is the resultant of the actuating pressure p_B1 and the spring force of the spring arrangement 7. Since the spring force of the spring arrangement 7 acts on the piston element 3 in the opening direction of the shift element B and when the pressure value of the control pressure p_EDS is zero the actuating pressure p_B1 is also essentially zero, at a control pressure p_EDS equal to zero the functional pressure p_W has a negative value. With increasing control pressure p_EDS the actuating pressure p_B1 increases as shown by the variation in FIG. 3, with a constant gradient up to a first pressure value p_EDS1 of the control pressure.

The actuating pressure p_B1 is applied at the second control edge 92 of the second clutch valve 9 and the second control edge 102 of the holding valve 10. In the present case the spring force of the spring arrangement 12 that acts on the valve slide 9A of the second clutch valve 9 is chosen such that the hydraulic pressure p_B2 corresponds essentially to the actuating pressure p_B1 up to the first control pressure value p_EDS1. This means that the actuating pressure p_B1 in the first pressure range of the control pressure p_EDS, which is between a pressure value of zero and the first control pressure p_EDS1, is applied essentially unchanged by the second clutch valve 9 and by the control edge 86 of the first clutch valve 8 on an active surface A38 of the third valve slide section 8A3 of the valve slide 8A of the first clutch valve 8.

In addition, the spring force of the spring arrangement 13 that acts upon the valve slide 10A of the holding valve 10 is chosen such that the actuating pressure p_B1 applied at the second control edge 102 by the third control edge 103 of the holding valve 10 and the fifth control edge 85 of the first clutch valve 8, is applied on the active surface A28 of the second valve slide section 8A2 of the valve slide 8A of the first clutch valve 8 as a hydraulic pressure which is varied as a function of the control pressure p_EDS and is equivalent to the actuating pressure p_B1, and which opposes the control pressure p_EDS.

Within a second pressure range of the control pressure p_EDS, which starts from the first control pressure value p_EDS1 that delimits the first pressure range of the control pressure p_EDS and extends from this first control pressure value p_EDS1 up to a second, higher control pressure value p_EDS2, the actuating pressure p_B1 increases with increasing control pressure p_EDS more steeply than in the first pressure range of the control pressure p_EDS.

This results from the fact that above the first control pressure value p_EDS1, the valve slide 9A of the second clutch valve 9 is pushed increasingly by the control pressure p_EDS against the spring arrangement 12. The actuating pressure p_B1 applied in the area of the second control edge 92 on the second clutch valve 9 is progressively reduced in a modulated operating condition of the second clutch valve 9 and is applied as a hydraulic pressure p_B2 on the third active surface A38 of the valve slide 8A of the first clutch valve 8. The hydraulic pressure p_B2, which is adjustable in the area of the second clutch valve 9 and is equivalent to the actuating pressure p_B1, is essentially zero at the second control pressure value p_EDS2.

At the second control pressure value p_EDS2 the valve slide 10A of the holding valve 10 is displaced in such manner that the third control edge 103 is connected with the fourth control edge 104, which in this case is a tank connection, and the second active surface A28 of the first clutch valve 8 is not pressurized. As a result, the valve slide 8A of the first clutch valve 8 is also fully displaced and the actuating pressure p_B1 increases abruptly to the pressure level of the system pressure p_sys. The shift element B is then acted upon in the area of the first piston surface 3A of the piston element 3 by the full engaging pressure, and has its maximum transmission capacity.

In the present case the valve device 2 of the actuating device 1 according to FIG. 2 has three pressure reduction valves 8 to 10. The actuating pressure p_B1 produced in the area of the first clutch valve 8 on the basis of the system pressure p_sys is passed on to the first piston surface 3A of the shift element B in the direction of the holding valve 10 and the second clutch valve 9. During modulated operation the hydraulic pressure p_B2 is adjusted by the second clutch valve 9, this pressure being related inversely proportionally to the control pressure p_EDS. This means that at low values of the control pressure p_EDS, the hydraulic pressure p_B2 produced in the area of the second clutch valve 9 is high, and corresponds at least to the actuating pressure p_B1 or feed pressure of the first clutch valve 8.

From an operating condition of the actuating device 1 at which the second clutch valve 9 changes over to its modulation operating condition, i.e. from a point in time when a total force component acting on the valve slide 9A of the second clutch valve 9 displaces the valve slide 9A against the spring force of the spring arrangement 12, the actuating pressure p_B1 no longer increases up to the control pressure p_EDS with valve ratio 1:1, but with a changed valve ratio. This results from the valve ratio between the first clutch valve 8 and the second clutch valve 9.

In this respect, the area ratio with which the first clutch valve 8 is controlled by the second clutch valve 9 is decisive. Thus, as a function of the predetermined area ratio in the area of the first clutch valve 8 and the second clutch valve 9, in the second pressure range of the control pressure p_EDS the valve ratio is substantially higher than in the first pressure range of the control pressure p_EDS. Owing to the design of the actuating device 1 described earlier, no pressure jump occurs at the inflection point of the variation of the actuating pressure p_B1, whereby uniform actuation of the shift element B, as is necessary for high shifting quality, is made possible.

Basically, the gradient of the pressure variation of the actuating pressure p_B1 can be determined from the following static valve equation of the first clutch valve 8, made without a spring arrangement.

$$p\_EDS \times A18 = p\_B1 \times A28 + p\_B2 \times A38$$

When the second clutch valve 9 is in its starting position, in which the valve slide 9A leaves the second control edge 92 completely open, the actuating pressure p_B1 is equal to the hydraulic pressure p_B2 that can be set in the area of the second clutch valve 9. If this relationship is inserted into the above equation system, one obtains for the valve gradient of the first clutch valve 8 in the first pressure range of the control pressure p_EDS or for the gradient of the actuating pressure p_B1 in the lower branch of the characteristic curve, the relationship formulated below:

$$dp\_B1/dp\_EDS = A18/(A28+A38) = i\_8$$

in which i_8 corresponds to the gradient of the pressure variation of the actuating pressure p_B1 in the first pressure range of the control pressure p_EDS.

The static valve equation for the second clutch valve 9 corresponds to the relationship formulated below:

$$p\_EDS \times A19 + p\_B2 \times A29 = F\_12$$

The active surface A29 of the valve slide 9A of the second clutch valve 9 corresponds to the area difference between the surfaces of the first valve slide section 9A1 and the second valve slide section 9A2 of the second clutch valve 9 that face toward one another, while the term F_12 in the formula is the spring force of the spring arrangement 12 that acts upon the valve slide 9A of the second clutch valve 9. If the static valve equation of the second clutch valve 9 is solved for the hydraulic pressure p_B2 that can be produced in the area of the second clutch valve 9, the relationship formulated below is obtained:

$$p\_B2 = F12/A29 - p\_EDS \times A19/A29.$$

If now, this function for the hydraulic pressure p_B2 is differentiated with respect to the control pressure p_EDS, the resolution of the valve ratio of the second clutch valve 9 is obtained as:

$$dp\_B2/dp\_EDS = -A19/A29 = i\_9.$$

If the formulated relationship for calculating the hydraulic pressure p_B2 that can be set by the second clutch valve 9 is used in the static equation for the first clutch valve 8 without a spring and the new equation so obtained is solved for the actuating pressure p_B1 and this is differentiated with respect to the control pressure p_EDS, the relationship formulated below is obtained:

$$dp\_B1/dp\_EDS = A18/A28 - dp\_B2/dp\_EDS \times A38/A28.$$

When the term dp_B2/dp_EDS is replaced by the term A19/A29, the resolution of the valve system consisting of the first clutch valve 8 and the second clutch valve 9 in the upper branch of the variation of the actuating pressure p_B1, or in the upper pressure range of the control pressure p_EDS, is obtained as follows:

$$dp\_B1/dp\_EDS = A18/A28 + A19/A29 \times A38/A28.$$

Figure 4:
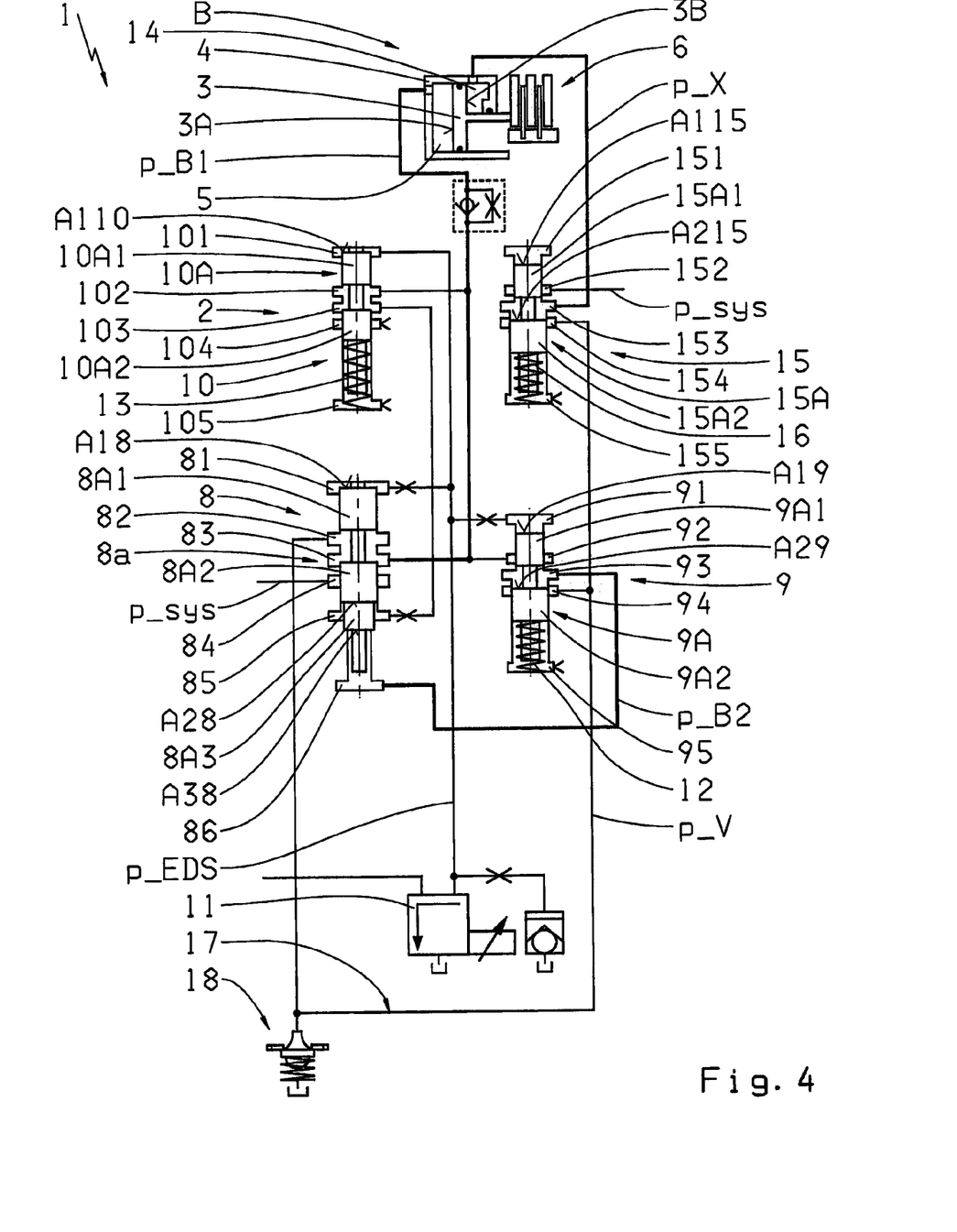
FIG. 4: Representation corresponding to FIG. 2, of a second example embodiment of the actuating device.

FIG. 4 shows a second example embodiment of the actuating device 1, which differs from the first example embodiment thereof shown in FIG. 2 essentially in the area of the shift element B and in an area of the valve device 2, although the function of the valve device 2 for adjusting the actuating pressure p_B1 corresponds essentially to the functionality described in relation to FIG. 2.

Figure 5:
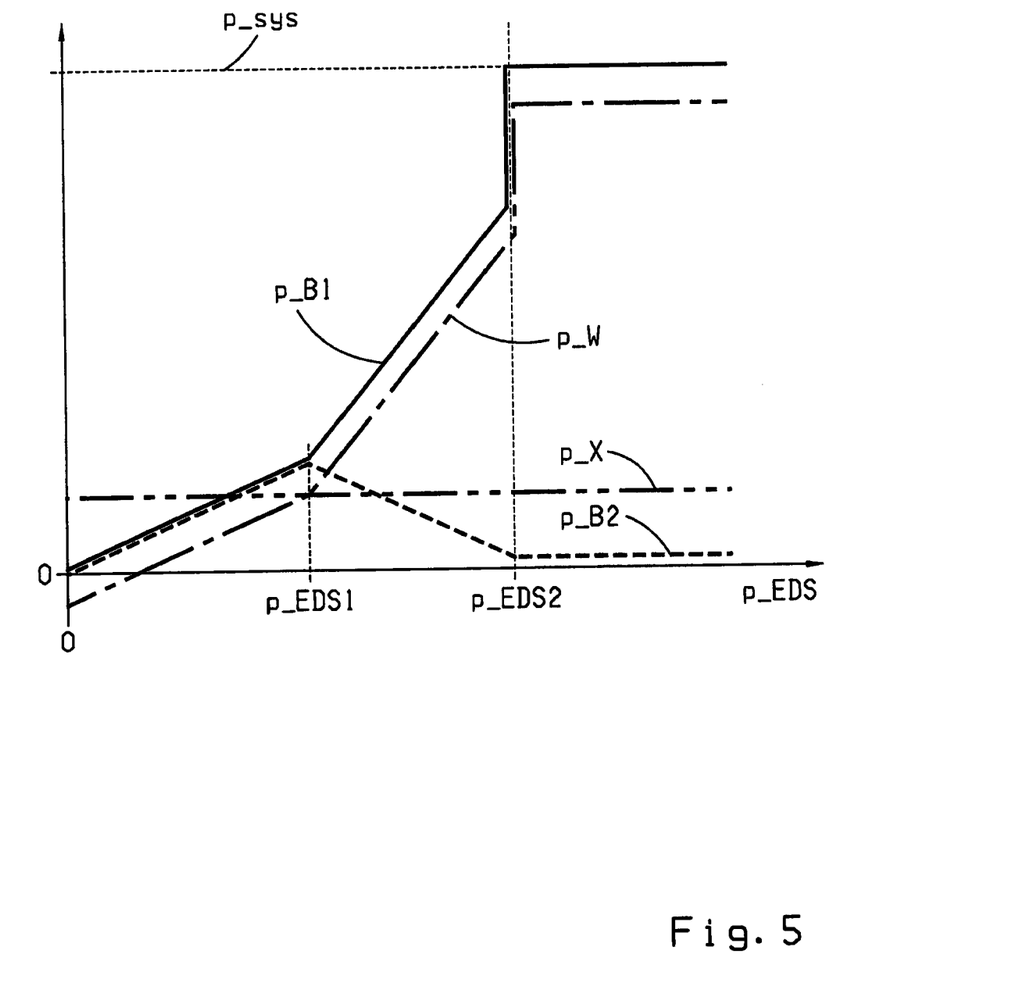
FIG. 5: Representation corresponding to FIG. 3, of various pressure variations that take place during the actuation of the shift element by the actuating device according to FIG. 4.

In the example embodiment of the actuating device 1 shown in FIG. 4, in contrast to the example embodiment of the actuating device 1 shown in FIG. 2 the shift element B is actuated in its disengaging direction not by the spring arrangement 7, but by a hydraulic actuating pressure p_X (see also FIG. 5). The hydraulic actuating pressure p_X that can be applied on a second piston surface 3B in the area of a second piston space 14 of the shift element B, can be adjusted by means of a second holding valve 15 of the valve device 2. For this purpose the second holding valve 15 is made with a valve slide 15A, which can also be displaced longitudinally and comprises two valve slide sections 15A1 and 15A2. The valve slide 15A is acted upon by a spring arrangement 16 which pushes it to a starting position. Depending on the position of the valve slide 15A at the time, control edges 151 to 155 are left open or sealed.

In this case the system pressure p_sys is applied at the control edge 152 of the second holding valve 15, this pressure being passed on at least partially in the direction of the second piston space 14 of the shift element B via the third control edge 153 when the valve slide 15A is in its starting position. In addition the hydraulic actuating pressure p_X, modified in the area of the second holding valve 15 and equivalent to the system pressure p_sys, is exerted on the valve slide 15 at the first control edge 151 and on an active surface A115 of the valve slide 15A in opposition to the spring arrangement 16.

A surface of the first valve slide section 15A1 of the valve slide 15A that faces toward the second valve slide section 15A2 has a smaller area than a surface of the second valve slide section 15A2 that faces toward the first valve slide section 15A1. During the operation of the actuating device 1, owing to the hydraulic pressure exerted in each case on an active surface area difference A215 between the active surfaces, a control pressure value of the hydraulic pressure p_X is produced over the entire pressure range of the control pressure p_EDS in the area of the second piston space 14.

Figure 6:
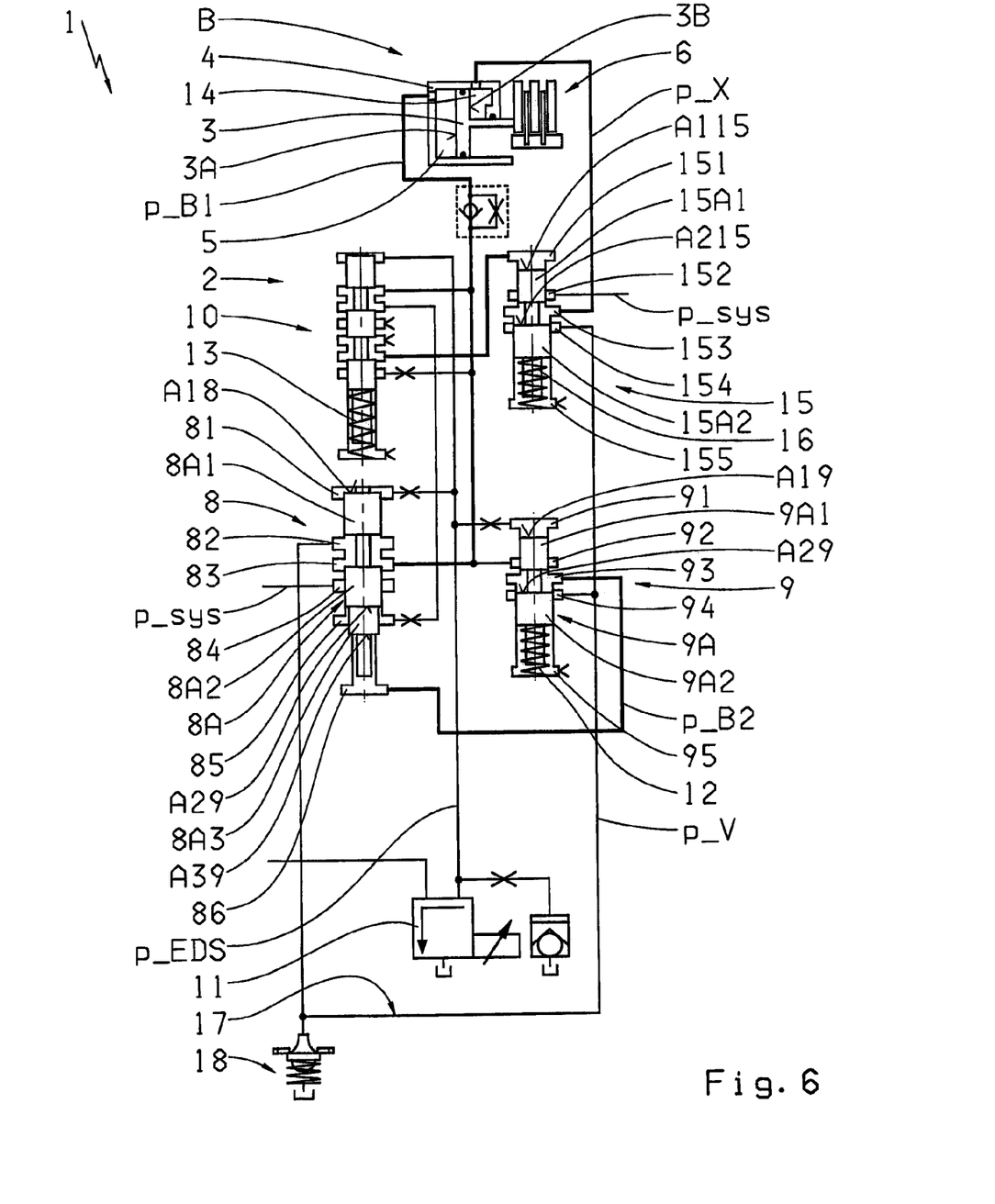
FIG. 6: Representation corresponding to FIG. 2, of a third example embodiment of the actuating device.

FIG. 6 shows a third example embodiment of the actuating device 1, which is essentially a further development of the second example embodiment in FIG. 4. In this third embodiment of the actuating device 1, compared with the previously described example embodiments thereof the first holding valve 10 is made with three additional control edges 106 to 108, such that at the control edge 108 the actuating pressure p_B1 that can be set in the area of the first clutch valve 8 is exerted. Moreover, the valve slide 10A is formed with a third valve slide section 103A by which, in the valve slide position shown in FIG. 6, the control edge 108 is separated from the control edge 107. The control edge 107 is connected with the first control edge 151 of the second holding valve 15.

Figure 7:
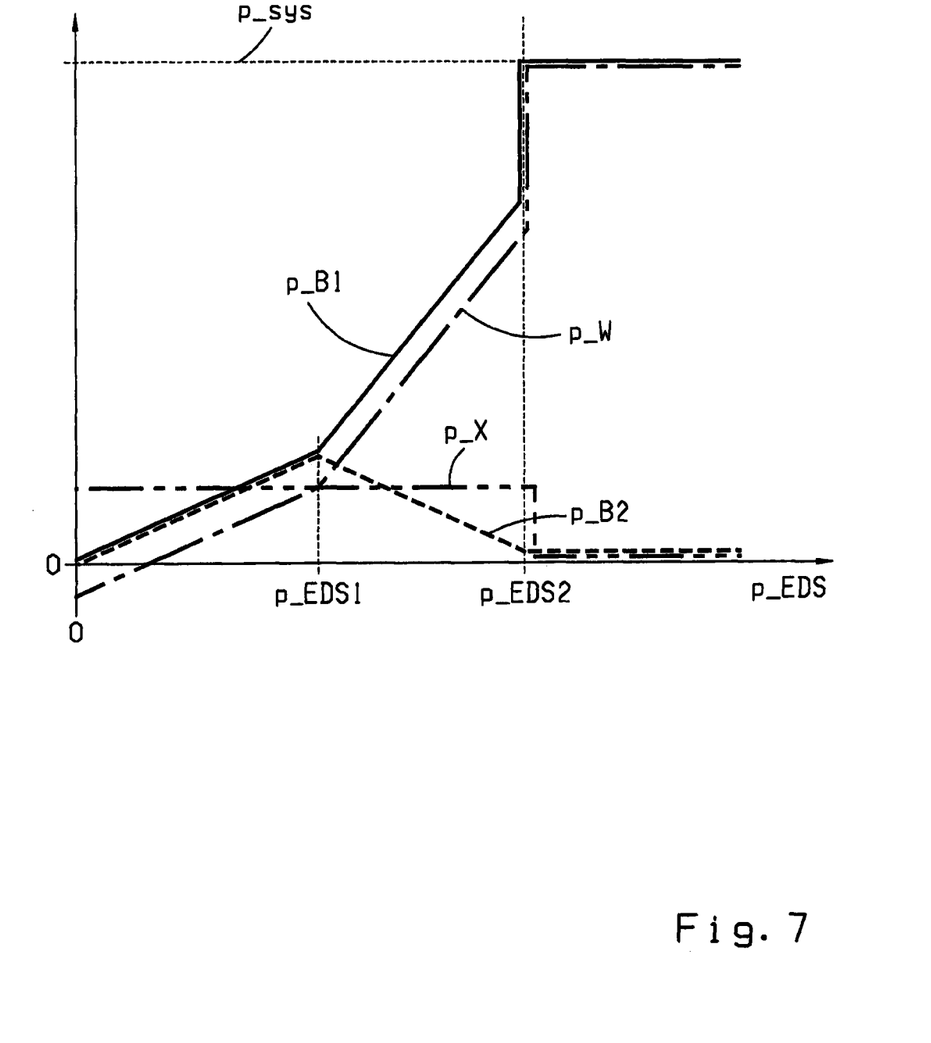
FIG. 7: Representation corresponding to FIG. 3, of various pressure variations that take place during the operation of the actuating device according to FIG. 6.

With increasing control pressure p_EDS the valve slide 10A of the first holding valve 10 is progressively pushed against the spring arrangement 13. From a defined position of the valve slide 10A a connection between the control edge 108 and the control edge 107 of the first holding valve 10 is opened by the valve slide 10A and a hydraulic pressure equivalent to the actuating pressure p_B1 is passed on in the direction of the face or active surface A115 of the valve slide 15A of the second holding valve 15. This passing on of the hydraulic pressure equivalent to the actuating pressure p_B1 to the face A115 of the valve slide 15A of the second holding valve 15 results in a displacement of the second holding valve 15, whereby the hydraulic actuating pressure p_X present in the second piston space 14 falls essentially to zero and the functional pressure essentially corresponds to the actuating pressure p_B1, as shown in FIG. 7. Thus, in a simple manner the total force component acting in the closing direction and exerted on the piston element 3 is increased further and the shift element B is available with a higher transmission capacity.

At the same time the second piston space 14 is connected via the third control edge 153 and the fourth control edge 154 to a pre-filling circuit 17, which in the present case provides a pre-filling pressure p_V of 0.2 bar via a pressure-limiting valve 18.

Alternatively, the fourth control edge 154 of the second holding valve 15 can also be connected directly to the sump of the transmission, or to an unpressurized area of the actuating device 1.

Figure 8:
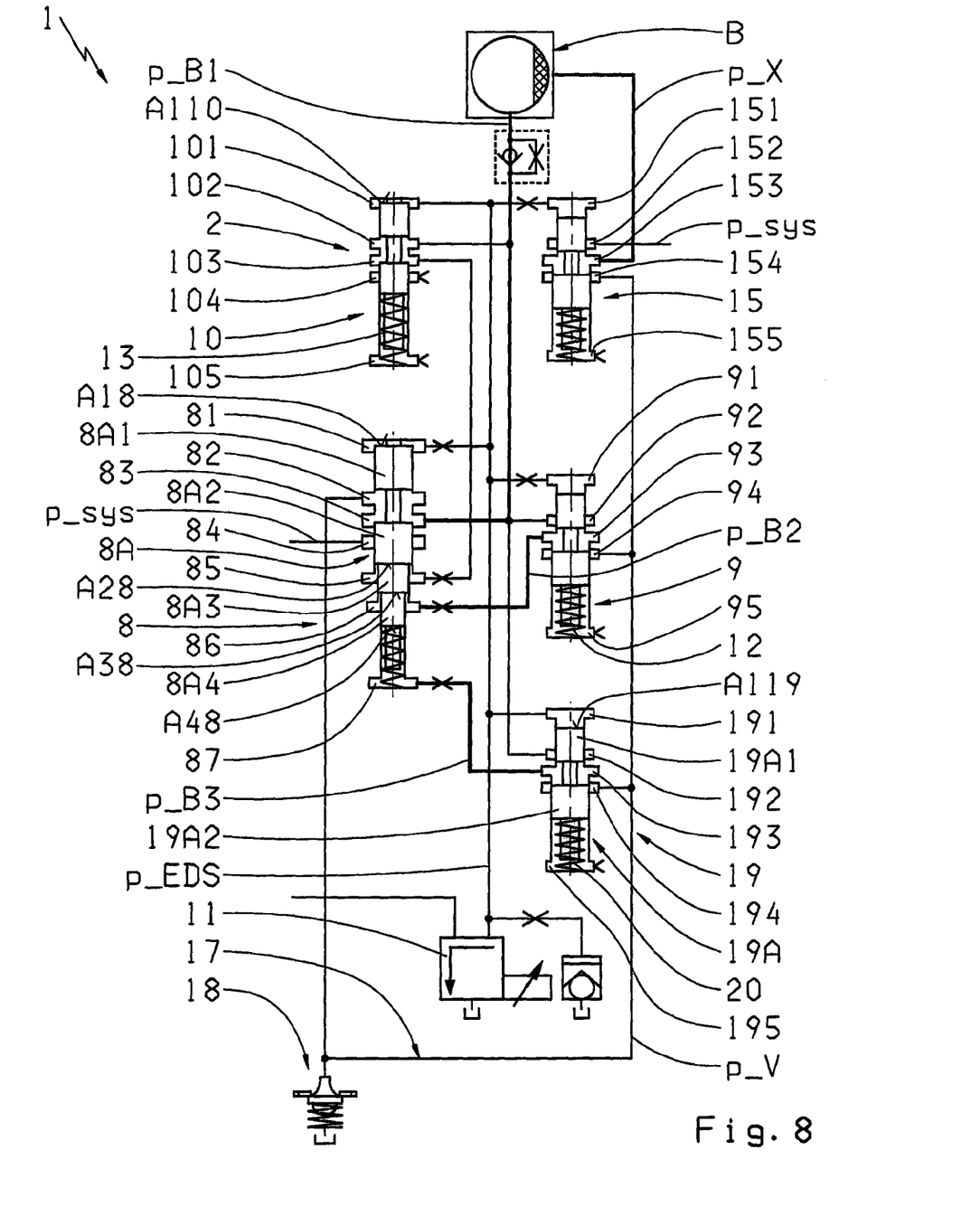
FIG. 8: Representation corresponding to FIG. 2, of a fourth example embodiment of the actuating device.

FIG. 8 shows a fourth example embodiment of the actuating device 1, which is in essence a further development of the third example embodiment shown in FIG. 6. Compared with the actuating device 1 of FIG. 6, the actuating device 1 shown in FIG. 8 comprises a third clutch valve 19 by means of which actuation of the shift element B can again be varied in a further pressure range of the control pressure p_EDS which follows on directly from the second pressure range of the control pressure p_EDS.

Starting with a control pressure p_EDS equal to zero, when the actuating pressure p_B1 is also equal to zero, the actuating pressure p_B1 increases as described earlier up to the first control pressure value p_EDS1 to the same extent as the hydraulic pressure p_B2 that can be produced in the area of the second clutch valve 9. Thereafter the hydraulic pressure p_B2 that can be produced in the area of the second clutch valve 9 decreases in the manner described earlier, while the actuating pressure p_B1 increases with the control pressure p_EDS at a steeper gradient.

The third clutch valve 19 is made with five control edges 191 to 195, which are left open or blocked depending on the position of a valve slide 19A. The valve slide 19A is made with two valve slide sections 19A1 and 19A2, which have different diameters. In the area of the first control edge 191 the valve slide 19A of the third clutch valve 19 can be acted upon by the control pressure p_EDS in the area of an active surface A119 of the valve slide 19A. At the same time the actuating pressure p_B1 is applied at the second control edge 192, which, up to the second control pressure value p_EDS2, is exerted unchanged via the third control edge 193 of the third clutch valve 19 at a further control edge 87 of the first clutch valve 8, on a further active surface A48 of an additional valve slide section 8A4 of the valve slide 8A, and acts in opposition to the control pressure p_EDS.

Figure 9:
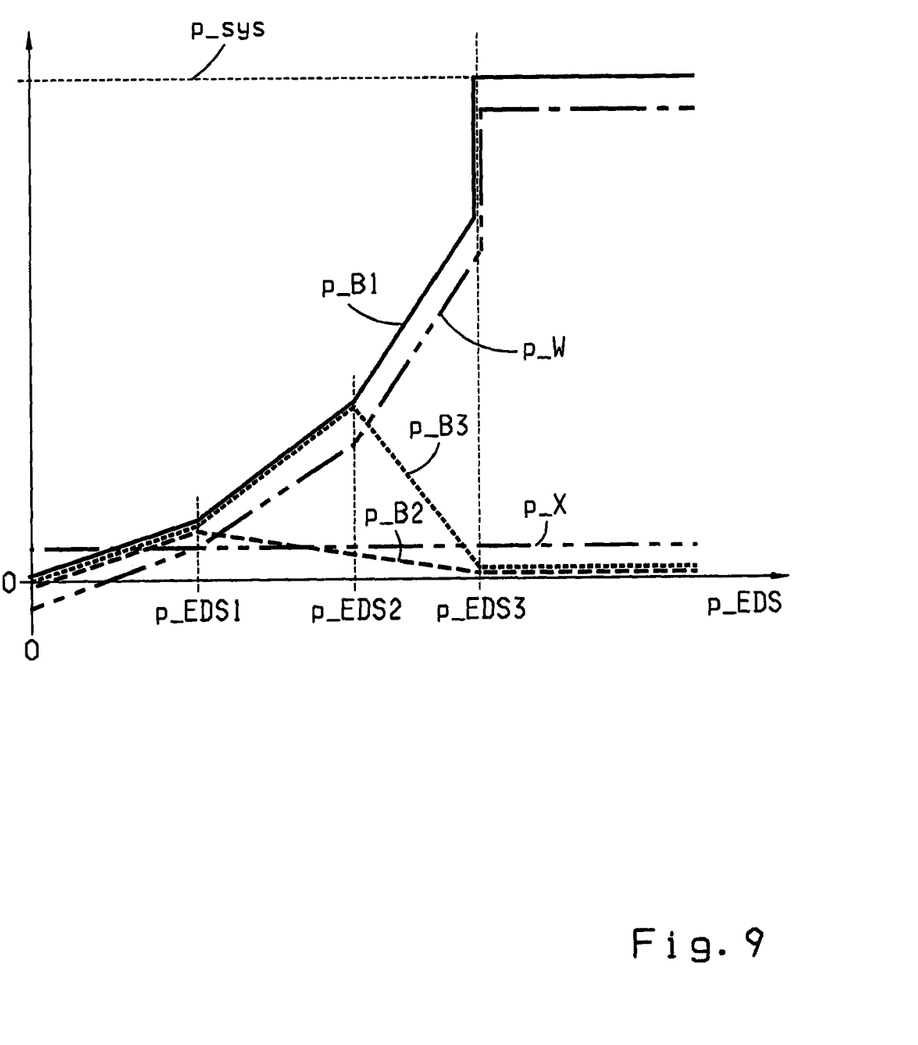
FIG. 9: A number of pressure variations represented as in FIG. 3, which take place during the operation of the actuating device according to FIG. 8.

When the second control pressure value p_EDS2 is exceeded, the valve slide 19A of the third clutch valve 19 is pushed against the spring arrangement 20 and a further hydraulic pressure p_B3 that can be set by the third clutch valve 19 and is equivalent to the actuating pressure p_B1 decreases toward zero as shown in FIG. 9, down to a third control pressure value p_EDS3. This has the result that with increasing control pressure p_EDS the actuating pressure p_B1 increases toward the closing pressure or the system pressure p_sys with a steeper gradient than in the second pressure range of the control pressure p_EDS.

At the third control pressure value p_EDS3 both the hydraulic pressure p_B2 that can be set in the area of the second clutch valve 9 and the hydraulic pressure p_B3 that can be set in the area of the third clutch valve 19 are equal to zero and the first holding valve 10 changes over from the starting position shown in FIG. 8, whereby in the area of the first clutch valve 8, the system pressure p_sys is passed in full into the first piston space 5. Then, the shift element B is acted upon with its full engaging pressure and has its maximum transmission capacity. The hydraulic actuating pressure p_X which acts in the disengaging direction and is present in the further piston space 14, is constant over the entire pressure range of the control pressure p_EDS.

INDEXES

1 Actuating device
2 Valve device

3 Piston element
3A First piston surface
3B Second piston surface
4 Cylinder
5 First piston space
6 Disk packet
7 Spring arrangement
8 First clutch valve
8A Valve slide
8A1 to 8A4 Valve slide sections
A18 to A48 Active surfaces of the valve slide of the first clutch valve
9 Second clutch valve
9A Valve slide
9A1, 9A2 Valve slide sections
A19, A29 Active surfaces of the valve slide of the second clutch valve
10 First holding valve
10A Valve slide
10A1, 10A2,
10A3 Valve slide sections
A110 Active surface of the valve slide of the first holding valve
11 Pressure regulator
12 Spring arrangement of the second clutch valve
13 Spring arrangement of the first holding valve
14 Second piston space of the shift element
15 Second holding valve
15A Valve slide of the second holding valve
15A1, 15A2 Valve slide sections
A115, A215 Active surfaces
16 Spring arrangement of the second holding valve
17 Pre-filling circuit
18 Pressure-limiting valve
19 Third clutch valve
19A Valve slide
19A1, 19A2 Valve slide sections
A119 Active surface
20 Spring arrangement of the third clutch valve
81 to 87 Control edges
91 to 95 Control edges
101 to 108 Control edges
151 to 155 Control edges
"1" to "8" Gear ratios for forward driving
"N" Neutral operating condition
"P" Parked operating condition
"R" Gear ratio for reverse driving
A to E Shift elements
i Valve transmission ratio
p_B1 Actuating pressure
p_B2 Hydraulic pressure
p_B3 Hydraulic pressure
p_EDS Control pressure
p_EDS1 First control pressure value
p_EDS2 Second control pressure value
p_EDS3 Third control pressure value
p_sys System pressure
p_V Pre-filling pressure
p_W Functional pressure
p_X Hydraulic actuating pressure

The invention claimed is:

1. An actuating device (1) for a shift element (B) of a transmission mechanism, that is actuatable by a hydraulic first actuating pressure (p_B1), with a valve device (2), such that the valve device (2) is acted upon in an area of at least a first active surface (A18) of a first valve slide (8A) and a first active surface (A19) of a second valve slide (9A) by a control pressure (p_EDS) in order to vary the first actuating pressure (p_B1), a second active surface (A38) of the first valve slide (A8) is acted upon by a second hydraulic pressure (p_B2) which is equivalent to the first actuating pressure (p_B1), acts in opposition to the control pressure (p_EDS) and is adjustable by means of the second valve slide (9A) as a function of the control pressure (p_EDS) applied, such that a variation of the control pressure (p_EDS) within a first pressure range of the control pressure (p_EDS) leads to a smaller variation of the first actuating pressure (p_B1) than within a second pressure range of the control pressure (p_EDS) that follows on from the first pressure range of the control pressure (p_EDS).

2. The actuating device according to claim 1, wherein in an area of a third active surface (A28) of the first valve slide (8A), the first valve slide (8A) is acted upon by a further hydraulic pressure which is adjustable by means of a third valve slide (10A) which is acted upon in an area of an active surface (A110) of the valve device (2) by the control pressure (p_EDS) and is equivalent to the first actuating pressure (p_B1).

3. The actuating device according to claim 2, wherein an area ratio between the first active surface (A18) of the first valve slide (8A) on which the control pressure (p_EDS) is applied, and a sum of the second and the third active surfaces (A28, A38) of the first valve slide (8A) which are acted upon respectively by either the second hydraulic pressure (p_B2) or the further hydraulic pressure, is equal to unity.

4. The actuating device according to claim 2, wherein a spring force of a spring arrangement (13) that opposes the control pressure (p_EDS) acts upon the third valve slide (10A).

5. The actuating device according to claim 4, wherein the spring force of the spring arrangement (13) associated with the third valve slide (10A) is selected such that the further hydraulic pressure exerted on the second active surface (A38) of the first valve slide (8A), which is adjustable in the area of the third valve slide (10A), is at least approximately zero above a threshold value (p_EDS2) of the control pressure (p_EDS).

6. The actuating device according to claim 1, wherein a spring force of a spring arrangement (12) that opposes the control pressure (p_EDS) acts upon the second valve slide (9A).

7. The actuating device according to claim 1, wherein a fourth slide valve (19A) is provided, on which the control pressure (p_EDS) is exerted in an area of at least one active surface (A119), and by which a third hydraulic pressure (p_B3) equivalent to the first actuating pressure (p_B1) is set, by which the first valve slide (8A) is acted upon in an area of a fourth active surface (A48) to oppose the control pressure (p_EDS).

8. The actuating device according to claim 7, wherein a spring force of a spring arrangement (20) that opposes the control pressure (p_EDS) acts upon the fourth slide valve (19A).

9. The actuating device according to claim 1, wherein a spring arrangement (7) is provided in an area of the shift element (B), which acts in opposition to the first actuating pressure (p_B1) and in a disengaging direction of the shift element (B).

10. The actuating device according to claim 1, wherein in an area of the shift element (B) a dual-action piston element (3) is provided, and the first actuating pressure (p_B1) is applied on the piston element (3) in a first piston space (5), while in an area of a second piston space (14) the piston element (3) is acted upon by a third hydraulic actuating pressure (p_X) which is adjustable by a third valve slide (15A) and which opposes the first actuating pressure (p_B1).

11. The actuating device according to claim 10, wherein either a system pressure (p_sys) or another hydraulic pressure equivalent thereto is exerted on the third valve slide (15A), and the system pressure (p_sys) or the hydraulic pressure equivalent thereto is varied by the third valve slide (15A) and is passed on toward the second piston space (14) of the shift element (B).

12. The actuating device according to claim 11, wherein the control pressure (p_EDS) is applied on an active surface (A115) of the third valve slide (15A) in order to vary one of the system pressure (p_sys) and the hydraulic pressure equivalent thereto.

13. The actuating device according to claim 10, wherein a hydraulic pressure, that is set in an area of the third valve slide (10A) and is equivalent to the first actuating pressure (p_B1), is exerted on an active surface (A115) of the third valve slide (15A) in order to vary one of the system pressure (p_sys) and the hydraulic pressure equivalent thereto.

14. The actuating device according to claim 10, wherein the third hydraulic pressure (p_X) which is equivalent to the system pressure (p_sys) and set in an area of the third valve slide (15A), is exerted in an area of an active surface (A115) of the third valve slide (15A), and the third hydraulic pressure (p_X) acts in opposition to a spring arrangement (16) which acts upon the third valve slide (15A).

15. An actuating device (1) for a shift element (B) of a transmission mechanism, that is actuated by a first hydraulic pressure (p_B1), the actuating device (1) comprising a valve device (2) having first and second valve slides (8A, 9A), a first active surface (A18, A19) of each of the first and the second valve slides (8A, 9A) is exposed to a control pressure (p_EDS) to vary the first hydraulic pressure (p_B1), a second active surface (A38) of the first valve slide (A8) is exposed a second hydraulic pressure (p_B2) which is equivalent to the first hydraulic pressure (p_B1), the second hydraulic pressure (p_B2) applies a force on the second valve slide (9A) that is opposite to a force applied on the second valve slide (9A) by the control pressure (p_EDS) and the second hydraulic pressure (p_B2) is adjustable by the second valve slide (9A) as a function of the control pressure (p_EDS) applied, such that variation of the control pressure (p_EDS) within a first pressure range results in a smaller variation of the first hydraulic pressure (p_B1) than variation of the control pressure (p_EDS) within a second pressure range which follows the first pressure range.

* * * * *